United States Patent
Merchant et al.

(10) Patent No.: US 6,625,146 B1
(45) Date of Patent: Sep. 23, 2003

(54) METHOD AND APPARATUS FOR OPERATING A NETWORK SWITCH IN A CPU-LESS ENVIRONMENT

(75) Inventors: Shashank Merchant, Sunnyvale, CA (US); Robert A. Williams, Cupertino, CA (US); Ching Yu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/321,833

(22) Filed: May 28, 1999

(51) Int. Cl.[7] .............................................. H04L 12/56

(52) U.S. Cl. ..................... 370/389; 370/349; 709/222; 712/26

(58) Field of Search ................................ 370/388, 389, 370/392, 393, 351, 391, 396–399, 395.3, 395.31, 395.7, 395.71, 422, 349, 546, 901, 902, 428–429; 709/200, 220, 222; 712/25, 26, 27, 38

(56) References Cited

U.S. PATENT DOCUMENTS

| | | | |
|---|---|---|---|
| 5,515,376 A | | 5/1996 | Murthy et al. |
| 6,084,878 A | * | 7/2000 | Crayford et al. ............ 370/389 |
| 6,111,874 A | * | 8/2000 | Kerstein ...................... 370/389 |
| 6,130,891 A | * | 10/2000 | Lam et al. ................... 370/401 |
| 6,181,702 B1 | * | 1/2001 | Egbert ......................... 370/401 |
| 6,335,938 B1 | * | 1/2002 | Chiang et al. .............. 370/458 |
| 6,336,156 B1 | * | 1/2002 | Chiang ......................... 710/45 |
| 6,393,021 B1 | * | 5/2002 | Chow et al. ................. 370/378 |
| 6,445,709 B1 | * | 9/2002 | Chiang ........................ 370/399 |

* cited by examiner

Primary Examiner—Hassan Kizou
Assistant Examiner—Andrew M. Waxman

(57) ABSTRACT

A method and apparatus are disclosed for operating a network switch without the use of a CPU. A control interface is used to connect the network switch to the external CPU. The control interface generates an initialization signal indicative of the absence of a CPU. Upon receiving the initialization signal, an internal rules checker initializes the network switch. The internal rules checker will then begin receiving data frames and forwarding them to the appropriate network stations based on a source address and destination address contained in the data frames.

27 Claims, 14 Drawing Sheets

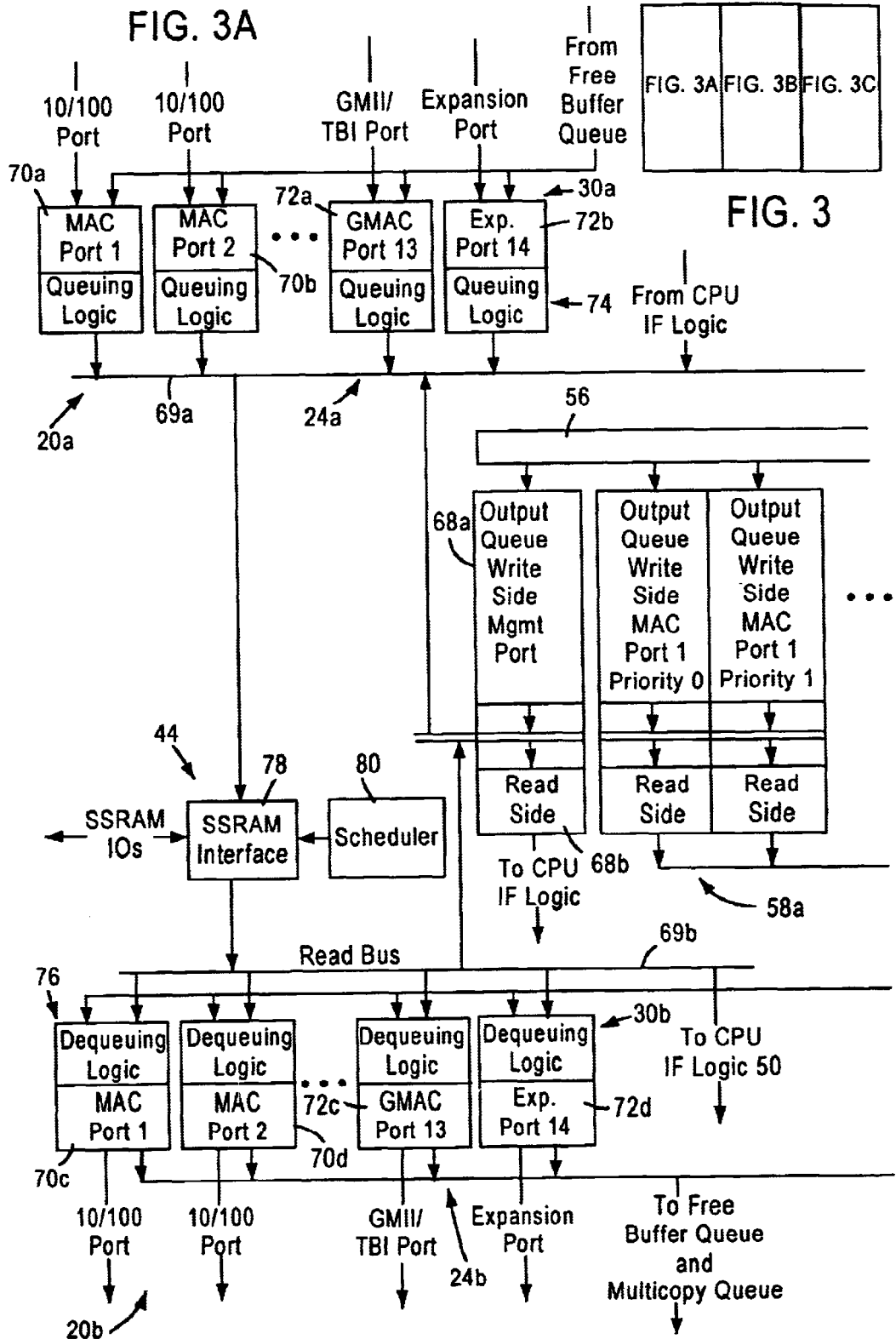

METHOD AND APPARATUS FOR OPERATING A NETWORK SWITCH IN A CPU-LESS ENVIRONMENT

BACKGROUND OF THE INVENTION

1. Field of the Invention

The present invention relates to communication systems, and more particularly, to a method and apparatus for operating a network switch without the use of a CPU.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program, and is segmented into multiple data frames and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The switch makes forwarding decisions upon receipt of the data frames based on information contained in a header of each data frame. For example, if a received data frame is to be transmitted to a number of end stations, the switch must make the forwarding decision to forward the data frame to the ports of the correct end stations. Prior to engaging in routine network activity, however, it is necessary to properly initialize and configure the network switch in order to enable transmission of data frames between the various stations.

Initialization and configuration of the network switch are typically accomplished by a host microprocessor, i.e., a Central Processing Unit, (or CPU) that configures and controls the network switch prior to, and during runtime. Microprocessors, however, can be relatively costly and require substantial hardware and software resources to support basic operations. For example, microprocessor implementations may require reserved storage space in a read-only memory (ROM) in order to store the instruction sets and operating system code necessary for execution of the control functions that interface the microprocessor to the network switch. Microprocessors additionally require non-volatile random access memory (RAM) devices for storing routines that control operation of the network switch. Additional interface devices may also be necessary for controlling data transfer between the host microprocessor and the network switch. Finally, the host microprocessor is often responsible for controlling and monitoring numerous functions that are unrelated to operation of the network switch. Consequently, an unnecessary delay is caused when the microprocessor is also responsible for management and control of the network switch. This delay is particularly apparent at startup when the microprocessor must initialize various devices prior to initializing the network switch.

Accordingly, a principal problem associated with network switches that must be controlled or initialized by a microprocessor is the delay that results when the microprocessor must also control various devices other than the network switch.

Another problem associated with network switches that must be controlled by a microprocessor is the cost and complexity associated with incorporating circuitry to interface the microprocessor to interact with the network switch.

DISCLOSURE OF THE INVENTION

There exists a need for an arrangement capable of quickly and efficiently initializing and configuring a multiport network switch without the use of a microprocessor.

These and other needs are addressed by the present invention wherein a multiport switch that receives data frames includes circuitry for forwarding the received data frames to one or more output ports thereof, without the use of a microprocessor.

In accordance with one aspect of the present invention, a method of operating a multiport switch in a CPU-less interconnect environment comprises the steps: transmitting an initialization signal from a control interface, used to connect the multiport switch and a CPU, to an internal rules checker that decides which one or more output ports of the multiport switch will output received data frames; transmitting a ready signal to the control interface to indicate that the internal rules checker is initialized; enabling the multiport switch; and forwarding received data frames to the one or more output ports of the multiport switch, based on a source address and a destination address stored in a header of each received data frame. The present method provides a low-cost arrangement for initializing and configuring a multiport switch without the use of a microprocessor. Hence, the multiport switch can be easily initialized while the microprocessor attends to the initialization of other components of its host station. One advantage of such an arrangement is the minimization of the down-time experienced before the multiport switch is operational.

In accordance with another aspect of the present invention, an apparatus is provided for operating a multiport switch in a CPU-less environment. The apparatus includes a control interface and an internal rules checker. The control interface is configured for connecting an external CPU to the multiport switch. The control interface generates an initialization signal upon detecting the absence of the CPU at start-up. The initialization signal is received by the internal rules checker which, in turn, initializes the multiport switch to receive and forward data frames to appropriate output ports. The internal rules checker then forwards data frames to the output ports based on a sending address and destination address contained in the header of each received data frame. According to the present invention the amount of time required to initialize the network switch at start-up can be reduced, while simultaneously reducing the cost of operation because no CPU is required.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
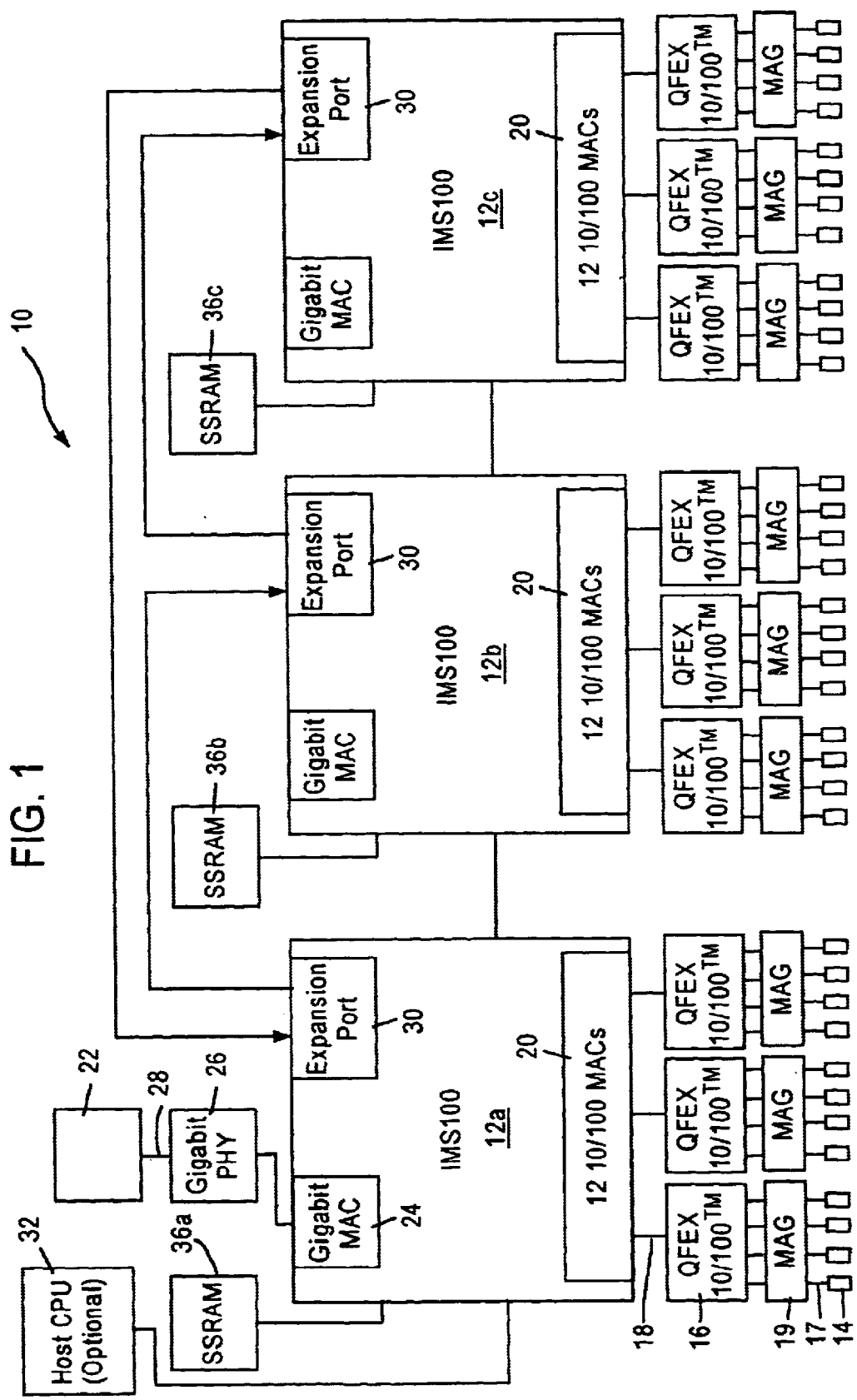
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 100/100 physical layer (PHY) transceivers 16 configured for sending and receiving data packets to and from the corresponding multiport switch 12 across a corresponding reduced media independent interface (RMII) 18. In particular, each 100/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
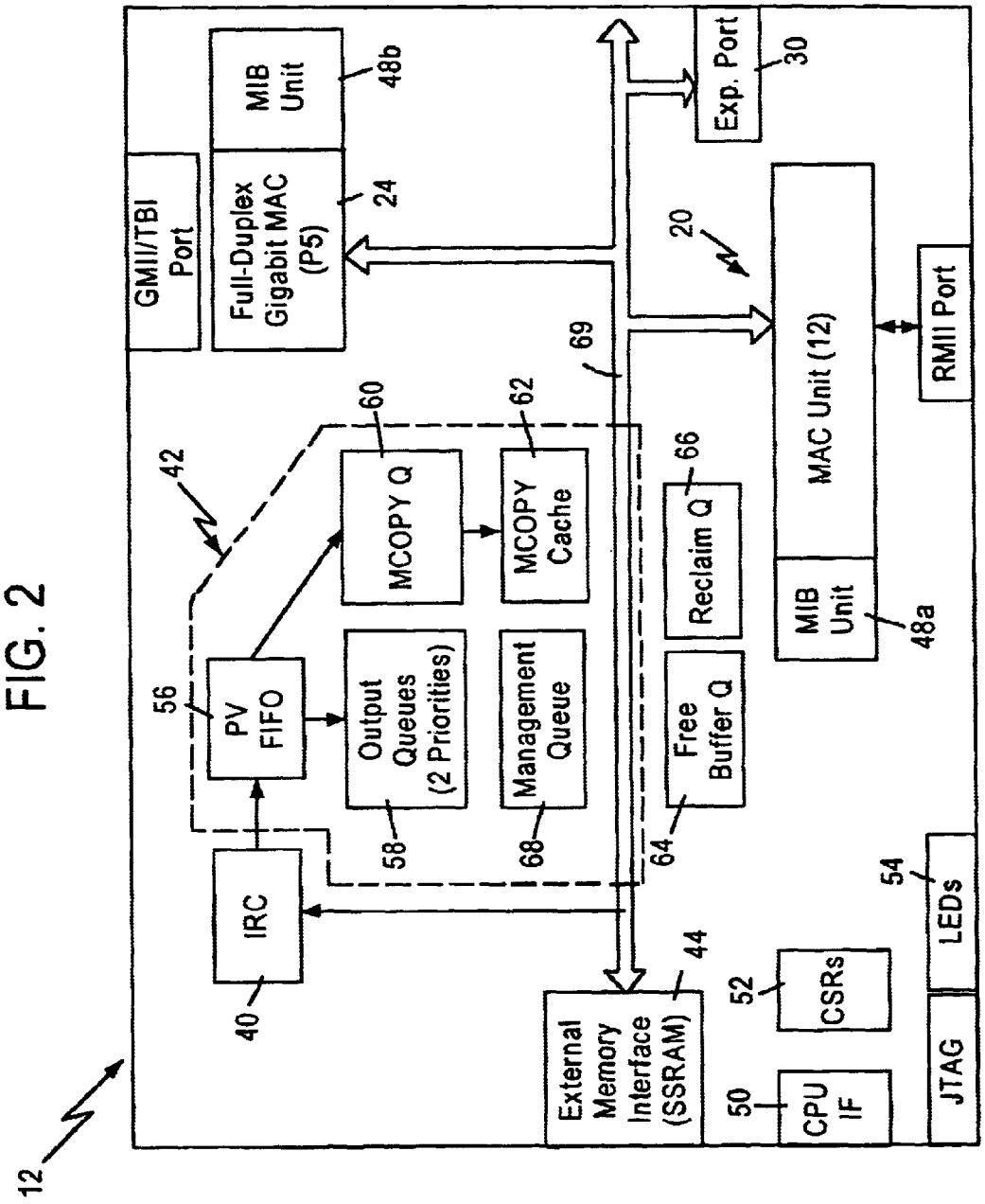
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an.external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 100/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer,queue 64 as free pointers. After being returned to the free buffer queue 64, the frame pointer is available for reuse by the MAC unit 20 or the gigabit MAC unit 24.

Figure 3B:
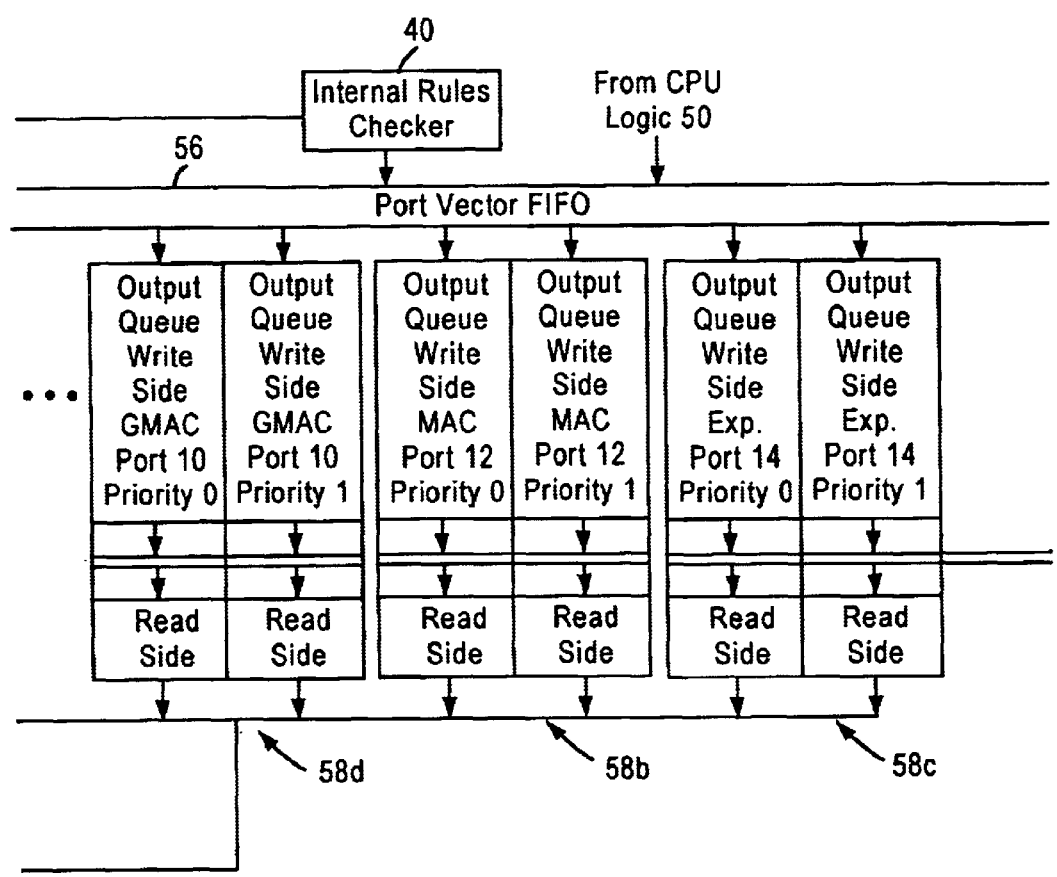
FIG. 3 is a block diagram illustrating in detail the switching subsystem of FIG. 2.
Figure 3C:
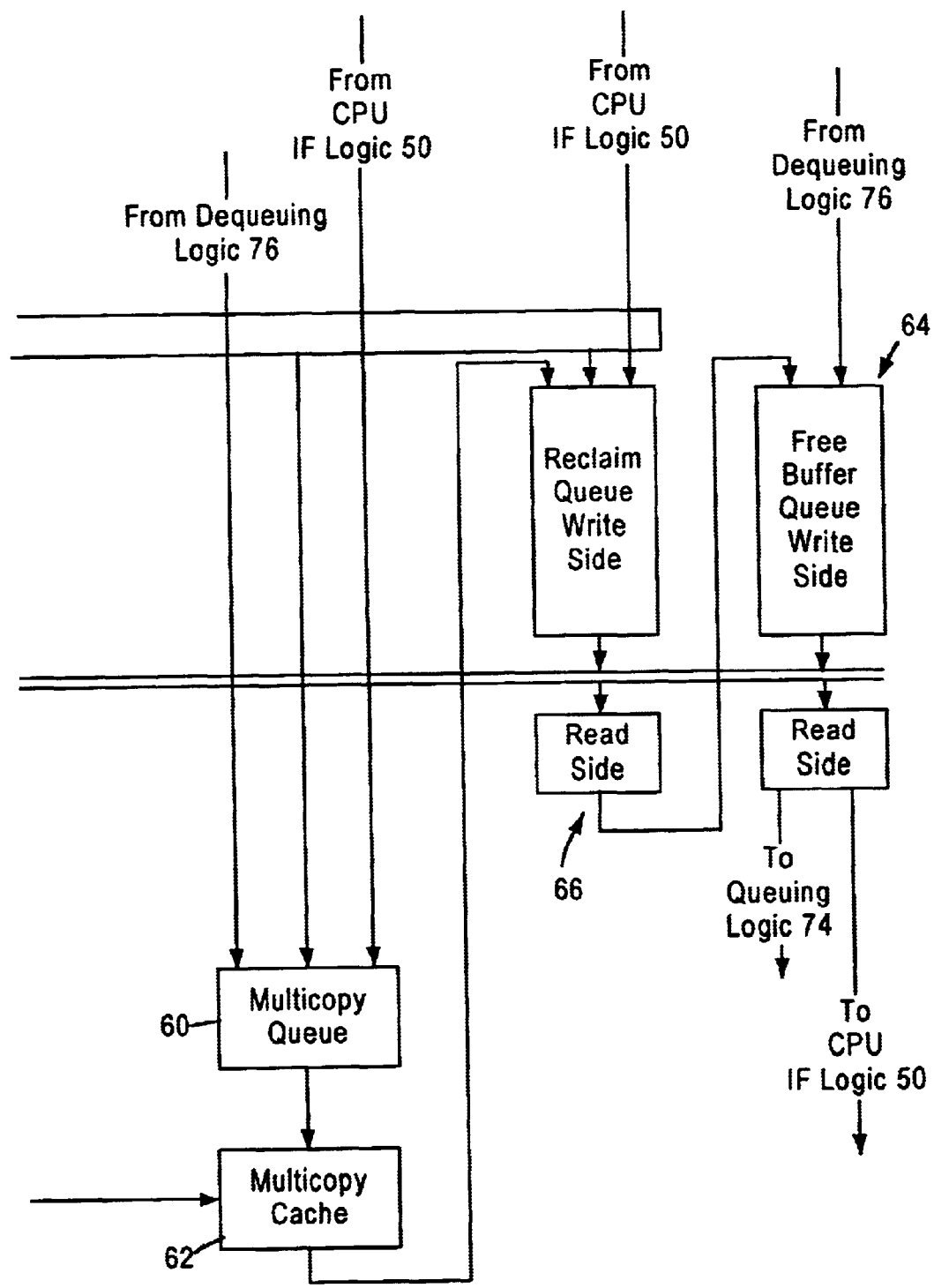

FIG. 3 depicts the switch subsystem 42 of FIG. 2 in more detail according to an exemplary embodiment of the present invention. Other elements of the multipart switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 100/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. In preferred embodiments, each of the output queues 58 has a high priority queue for high priority frames, and a low priority queue for low priority frames. The high priority frames are used for frames that require a guaranteed access latency, e.g., frames for multi-media applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58*d* for the gigabit transmit MAC 72*c*. The dequeuing logic 76 for the transmit gigabit port 24*b* takes the frame pointer from the corresponding gigabit port output queue 58*d*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the internal rules checker (IRC) 40 and address table used in making forwarding decisions will be discussed, followed by the details for initializing the multiport switch 12 and forwarding received data frames without a CPU 32.

IRC and Frame Forwarding

Figure 4:
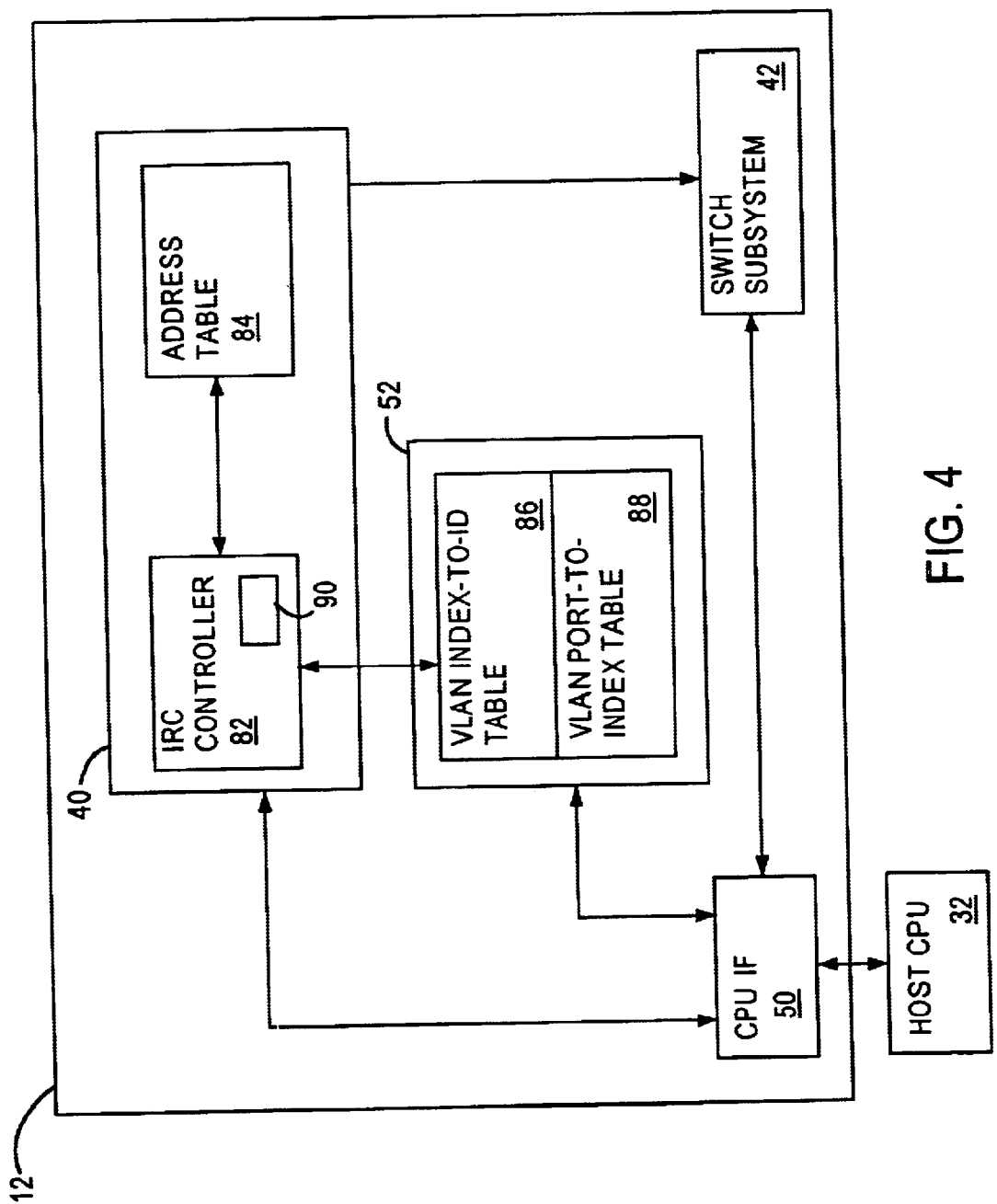
FIG. 4 is a block diagram of a system including the internal rules checker of FIG. 2 in accordance with an embodiment of the present invention.

FIG. 4 illustrates the IRC 40 which includes an IRC controller 82, an address table 84, and a sending address lookup logic 90. In the exemplary embodiment, the address table 84 is located within the IRC 40. In alternative embodiments, the address table may be located outside the IRC 40 within another part of the switch 12 or even external to the switch 12.

In the exemplary embodiment, the address table 84 supports 4096 user addresses and capabilities for 64 unique virtual local area networks (VLANs), although the number of addresses and VLANs supported may be increased by expanding the table size. As previously stated, the VLAN index is an identifier assigned to the data frame. According to the disclosed embodiment of the invention, if a CPU 32 is present, then VLAN index is in the form of a pointer into a table of VLAN identifiers. The VLAN identifier associated with the data frame is taken from the VLAN tag field in the data frame if such a field is provided. Otherwise the VLAN identifier is the default VLAN identifier associated with the receive port. Once the VLAN identifier is assigned to the data frame, the VLAN index associated with the data frame is determined by searching a table of VLAN identifiers. If there is no CPU 32 present, then all data frames are assigned the VLAN index of. Hence, the same table look-up hardware can be used regardless of whether or not the multiport switch 12 is being operated with CPU 32.

The VLANs provide "broadcast domains" whereby broadcast traffic is kept "inside" the VLAN.

For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network. In addition, the IRC 40 passes the header of each received data frame through the sending address lookup logic 90 in order to obtain matching entries within the address table 84.

Figure 5:
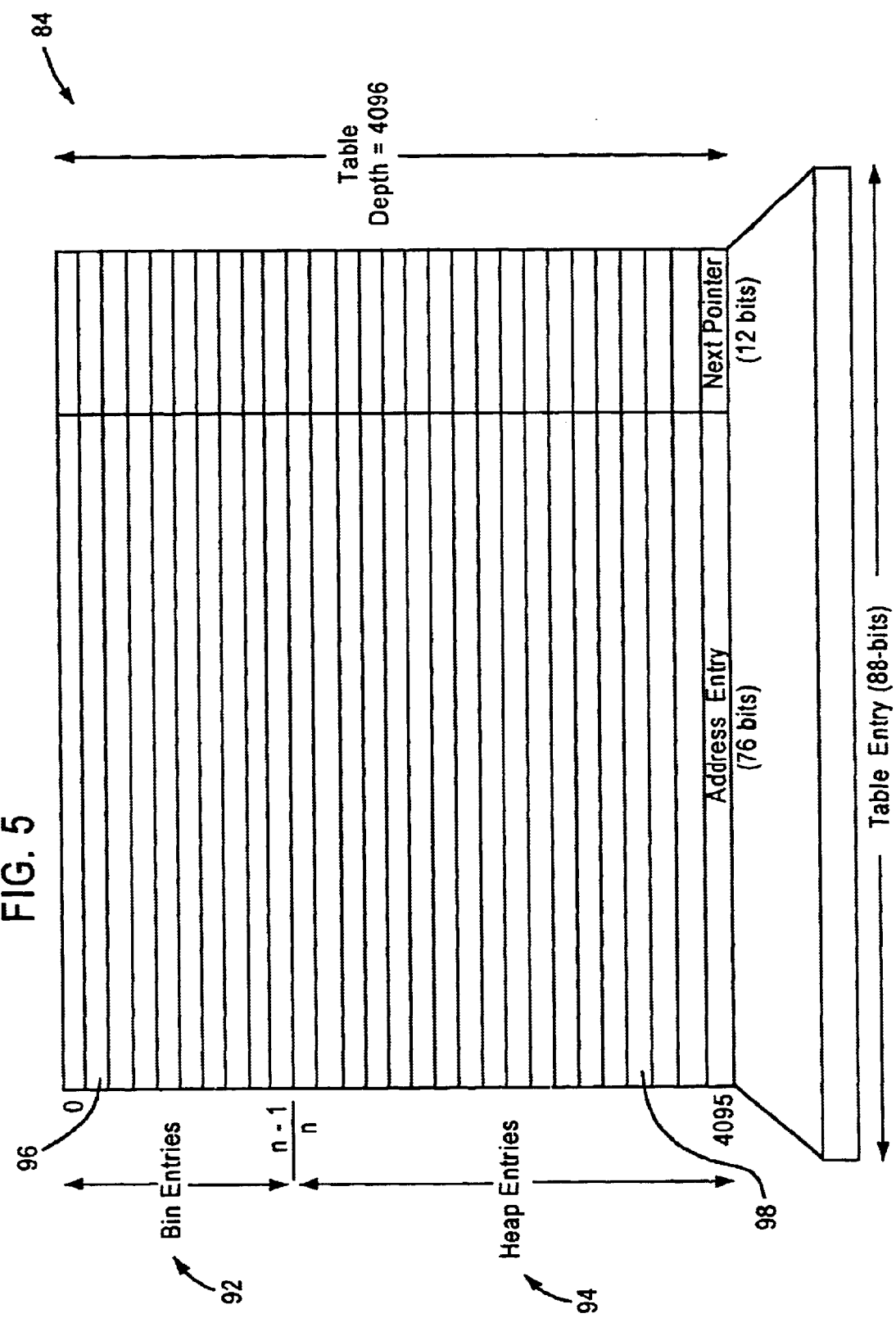
FIG. 5 illustrates the composition of the IRC address table of FIG. 4.

FIG. 5 illustrates the organization of the IRC address table 84. The IRC address table 84 contains an array of 4096 entries. The first "n" entries 92 are referred to as "bin entries" and have addresses from "0" to "n−1". The remaining entries 94 are referred to as "heap entries" and have addresses from "n" to "4095". Each of the table entries includes a 76-bit address entry field and a 12-bit "next pointer" field.

Figure 6:
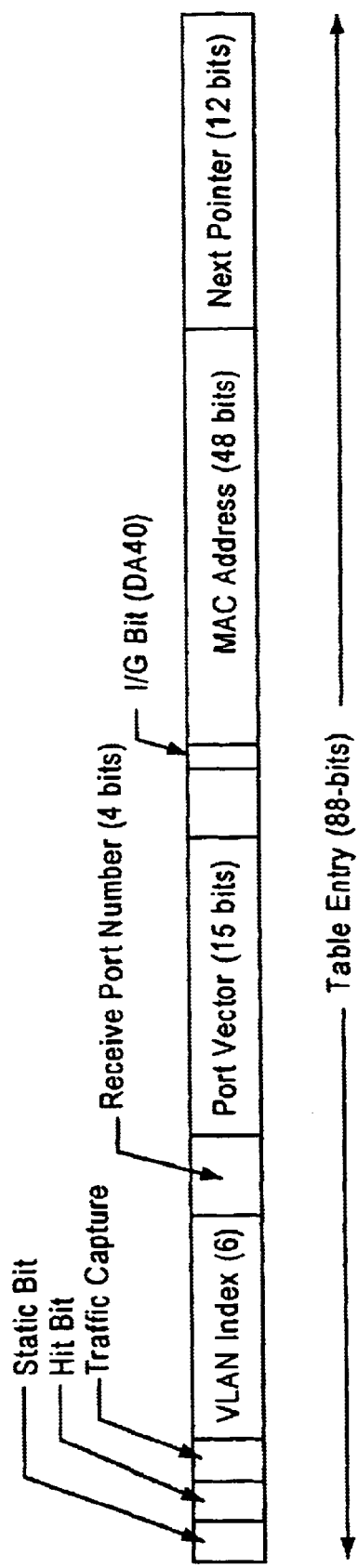
FIG. 6 illustrates the format of an IRC address table entry of the IRC address table of FIG. 5.

FIG. 6 illustrates the composition of each 88-bit table entry shown in FIG. 5. A hit bit is used by the IRC controller 82 for address entry "aging", discussed in more detail below, to delete entries from the address table 84. A static bit, also referred to as an aging override bit, is used to prevent deletion of an address entry within the address table 84.

A traffic capture bit is used to identify traffic capture source and destination MAC addresses for mirroring MAC conversations to the management queue 68. Each entry in the address table also includes a 6-bit VLAN index field used to reference a 12-bit VLAN identifier (ID). A VLAN index-to-VLAN ID table 86, shown in FIG. 4, contains the necessary mapping associations. During normal operation, the multiport switch 12 can receive both tagged and untagged frames. When the multiport switch 12 receives untagged data frames, i.e., without VLAN tag information, the IRC 40 assigns a VLAN index from a VLAN port-to-index table 88, based on the receive port on which the data frame is received. The VLAN index-to-ID table 86 and the VLAN port-to-index table 88 are located with the configuration and status registers 52. However, in alternative configurations, the tables 86 and 88 may be located within the IRC 40.

The receive port number field is a 4-bit field that identifies the port on which the associated MAC address resides. The port vector is a 15-bit field that provides a forwarding descriptor with a vector identifying the ports to which the data frame should be forwarded.

The MAC address field is a 48-bit field that includes both source addresses and destination addresses. The addresses stored in the MAC address field can be unicast, multicast or broadcast. An individual/group (I/G) bit is also included in the MAC address field.

During normal operation of the multiport switch, the host CPU 32 functions as the management entity and is connected to the IRC 40 via the CPU IF 50. Alternatively, a management MAC may be connected to the CPU IF 50 to function as the management entity.

Typically, the host CPU 32 is responsible for initializing the values in the address table 84. Upon power-up, the host CPU 32 loads values into the bin entries 92 based on the network configuration, including VLAN configurations. The IRC 40 uses the specific fields of the address table 84 to make frame forwarding decisions when frames are received by the multiport switch 12. More specifically, the IRC controller 82 includes control logic to search the address table 84 for frame forwarding information. From the information found in the address table 84, the IRC controller 82 creates a forwarding descriptor, which includes a frame pointer, a forwarding port vector, a receive port number, a VLAN ID, a priority class, and a control opcode. The IRC controller 82 then transmits the forwarding port vector to the port vector FIFO 56 for queuing, as illustrated in FIG. 3.

To generate the forwarding decision, the IRC controller 82 performs a source address (SA)/VLAN index/Receive (Rx) port number search and a destination address (DA)/VLAN index search. The switch 12 needs to make frame forwarding decisions relatively quickly, since multiple data frames may be received by the switch 12 simultaneously. Hence, in the exemplary embodiment of the present invention, a hashing scheme is used to search only a subset of the address entries, as described below. The memory structure of FIG. 5 provides an indexed arrangement, where a given network address will be assigned to a corresponding bin. In other words, each bin entry 96 is configured to reference a plurality of table entries (i.e., heap entries) 98. Hence, the IRC controller 82 performs a search of the address table 84 by first accessing a specific bin 96 pointed to by a hash key, and then searching the entries within (i.e., referenced by) the corresponding bin to locate the appropriate match.

Each bin entry 96 is the starting point for the search by the IRC controller 82 for a particular address within the address table 84. A bin entry may reference no addresses (i.e., be empty), may reference only one address within the bin entry location, or may reference a plurality of addresses using a linked list chain structure.

Figure 7:
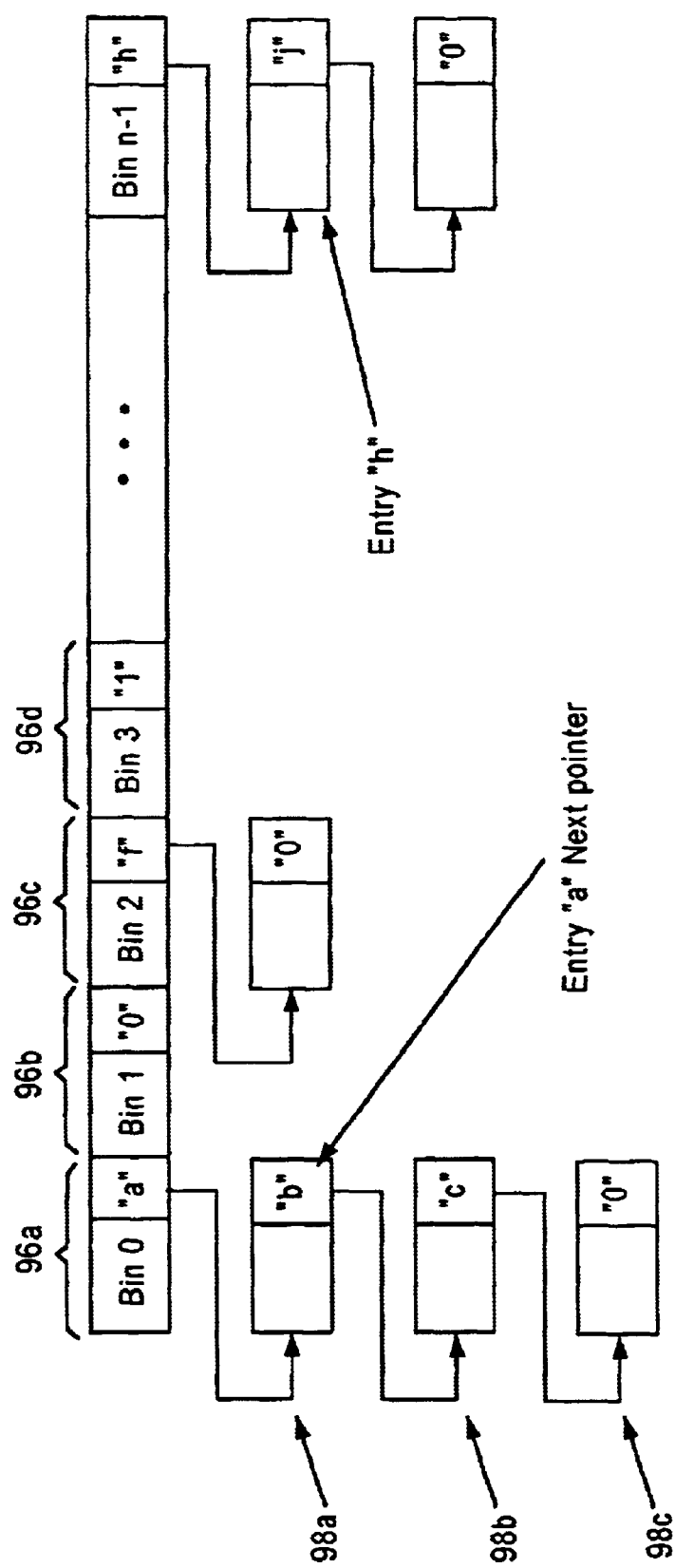
FIG. 7 illustrates linked list chains for identifying table entries relative to a selected bin.

FIG. 7 is a diagram illustrating bin entries referencing a different number of table entries. Each of the bin entries 96 and heap entries 98 includes the 76-bit address entry and a 12-bit "next pointer" field. The "next pointer" field associated with the bin entry 96 identifies the location of the next entry in the chain of linked list addresses. For example, Bin 3, 96d, of FIG. 7 does not have any associated table entries. In such a case, the 76-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 7. Thus, the first entry of Bin 0 is stored in the address entry field of the bin entry 96a and the next entry (heap entry 98a) is referenced by address entry "a" in the next pointer field of the bin entry 96a.

Figure 8:
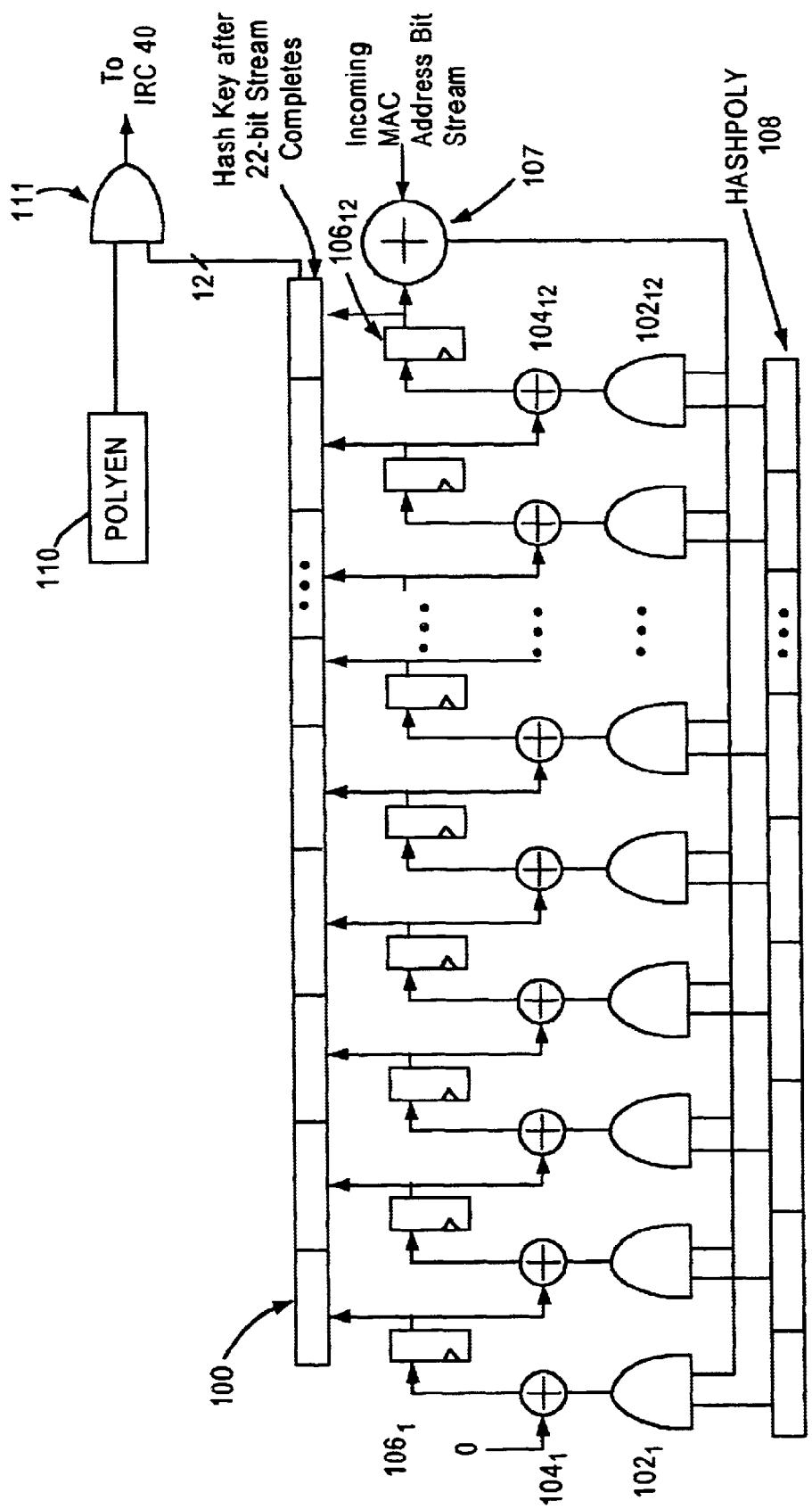
FIG. 8 is a circuit diagram illustrating a hash function calculator used with the internal rules checker of FIG. 2.

FIG. 8 is a circuit diagram illustrating an exemplary hash function calculator 100 used in accordance with an embodiment of the present invention. The hash function calculator 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function calculator 100. Exemplary hash polynomials for the hashing function of the present invention are $x^{12}+x^{10}+X^7+X^3+x^2+1$, which has a HASHPOLY of 0100 1000 1101; $X^{12}+X^{10}+X^5+X^3+1$, which has a HASHPOLY of 0100 0010 1001; and $x^{12}+X^{10}+X^8+X^7+X^4+X^2+1$, which has a HASHPOLY of 0101 1001 0101. The $x^{12}$ term is assumed to always equal "1", and therefore is not stored in the HASHPOLY register 108. Other polynomials may also be used for HASHPOLY based on the particular design requirements.

The hash function calculator 100 generates the hash key using the source address of the data frame according to a user-specified hash function. Initially, the IRC controller 82 concatenates the 16 least significant bits of the source address of the data frame with the VLAN index to create a search key. After the entire search key has been processed, the hash function circuit 100 outputs a 12-bit hash key.

From the 12-bit hash key, the IRC controller 82 calculates a bin number for searching the appropriate bin list in address table 86. More particularly, the IRC 40 uses the lower POLYEN bits of the hash key to generate the bin number. The bin number falls in the range of [0, n-1] where n=$2^{POLYEN}$ and the value of POLYEN is programmed by the host CPU 32 and stored in register 110. The hash key output by the hash function calculator 100 is output to a logic circuit, for example a 12-bit parallel AND gate 111, that selectively outputs the lower significant bits of the hash key based upon a polynomial enable value (POLYEN) stored in register 110. The field "POLYEN" defines how many bits of the hash key are used to create the bin number. For example, if POLYEN=5, then the IRC 40 uses the lower five bits of the hash key. Hence, the hash key output by the logic circuit 100 is based upon masking the 12-bit hash key using the stored register value POLYEN in register 110.

After the bin number is calculated, the IRC controller 82 searches the bin list of the particular bin for an address entry whose address, VLAN index and receive port number fields match the source address (SA), VLAN index and receive (Rx) port of the received frame.

If the IRC controller 82 finds an address entry whose address and VLAN index match the SA and VLAN index of the frame and whose Rx port field matches or corresponds to a port that is in the same "trunk", i.e., a set of ports predefined by the user, as the frame's Rx port, the IRC controller 82 sets the hit bit for that address entry.

The IRC controller 82 then searches the address table 84 for an address entry whose address and VLAN index match the destination address (DA) and VLAN index of the frame. The IRC 40 uses the 12-bit hash function calculator 100, illustrated in FIG. 8, to generate a 12-bit hash key for the DA/VLAN index search. The IRC 40 uses the lower POLYEN bits of the hash key to calculate the bin number in the address table 84. The IRC 40 then searches the appropriate bin list for a DA/VLAN index match in the address table 84. If a match is found, the IRC controller 82 uses the port vector field of the address entry to generate the forwarding descriptor.

When the IRC 40 cannot find a DA/VLAN index match, the frame must be "flooded" to all members of the VLAN. Once the necessary forwarding information has been obtained, the IRC controller 82 outputs a forwarding descriptor to the switch subsystem 42, which outputs the received data frame to the appropriate ports based upon the information in the forwarding descriptor.

With reference to FIG. 6, each table entry in the IRC address table 84 includes a static bit field, i.e., an aging override field, and a hit bit field used by the IRC controller 82 in connection with an aging algorithm. As discussed previously, the address table 84 contains a finite number of address entries due to limited space on the switch 12. Therefore, in accordance with disclosed embodiment, the IRC controller 82 provides a method of "aging" address entries and deleting these aged entries after a predetermined amount of time.

The IRC controller 82 automatically performs the aging function based on the contents of an IRC aging configuration register (not shown). The IRC aging configuration register is located with the configuration and status registers 52. However, in alternative configurations, the IRC aging configuration register may be located within the IRC 40.

Referring to FIG. 4, the IRC aging configuration register includes an auto-aging enable field and an aging timer field. When the auto-aging enable field is set, the IRC controller 82 automatically polls each entry in the address table 84 at regular intervals, with the particular interval determined by the aging timer field in register. Upon power-up, the IRC controller 82 sets the timer field to 300 seconds as a default timer value.

The IRC controller 82 "walks" each IRC bin list and examines the hit and static bits. An address entry with a set static bit indicates that the address entry was programmed under Host CPU 32 control and the address entry is not aged by the aging algorithm. However, when both the hit and static bits are clear, the IRC 40 deletes an aged address entry.

CPU-less Operation

Figure 9:
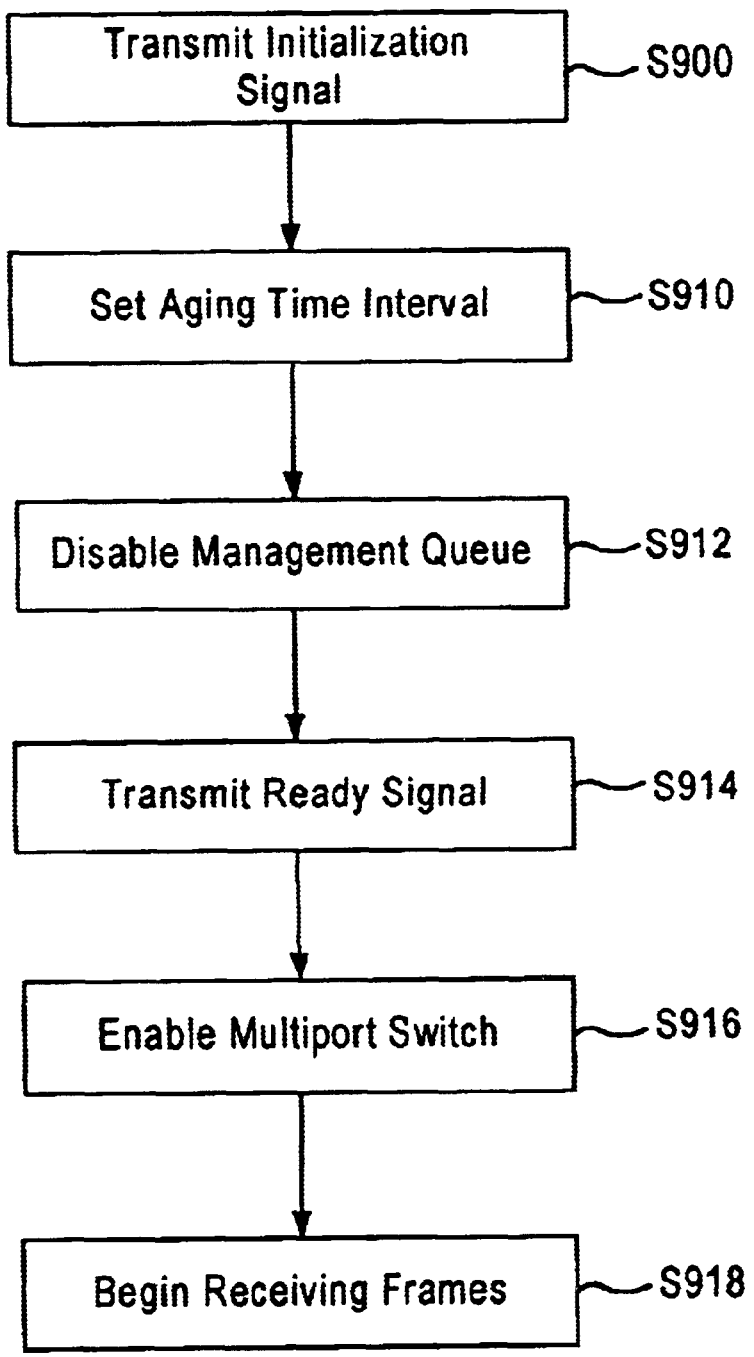
FIG. 9 is a flow chart illustrating the steps performed in initializing the multiport switch.

FIG. 9 is a flow chart illustrating the steps performed in initializing the multiport switch 12 within a CPU-less environment, according to an embodiment of the present invention. At step S900, an initialization signal is transmitted from a control interface such as, for example, the processor interface 50 that connects the CPU 32 to the multiport switch 12. The initialization signal indicates that there is no CPU 32 connected to the multiport switch 12, and therefore initialization should proceed. The initialization signal may, for example, be generated by the processor interface 50 if no CPU signals are received within a prescribed time interval such as, for example, 50 milliseconds. The initialization signal is transmitted to the IRC 40 that decides which of the output ports of the multiport switch 12 will forward the received data frames. At step S910, the IRC 40 sets an aging time interval for entries in the address table 84. The aging time interval corresponds to a predetermined delay that should be allowed to expire prior to aging entries stored in the address table 84 of the IRC 40. At step S912, the IRC 40 disables the management queue 68 of the multiport switch 12. As previously indicated, the management queue is used by the CPU 32 during the forwarding process. Hence, if there is no CPU 32 present, then the management queue 68 is not needed.

At step S914, the IRC 40 transmits a ready signal to the processor interface 50 to indicate that it has been initialized. At step S916, the multiport switch 12 is enabled. This is accomplished by initializing the various operating components of the multiport switch 12. For example, default values are loaded into all registers, and all of the queues used by the multiport switch are initialized to their default contents. During normal operations, the default values for the queues are usually zero. Furthermore, the external memory area 36 used by the multiport switch 12 is cleared. At step S918, the multiport switch 12 is enabled and ready to begin receiving data frames and directing such data frames to the proper network stations. 14.

Figure 10A:
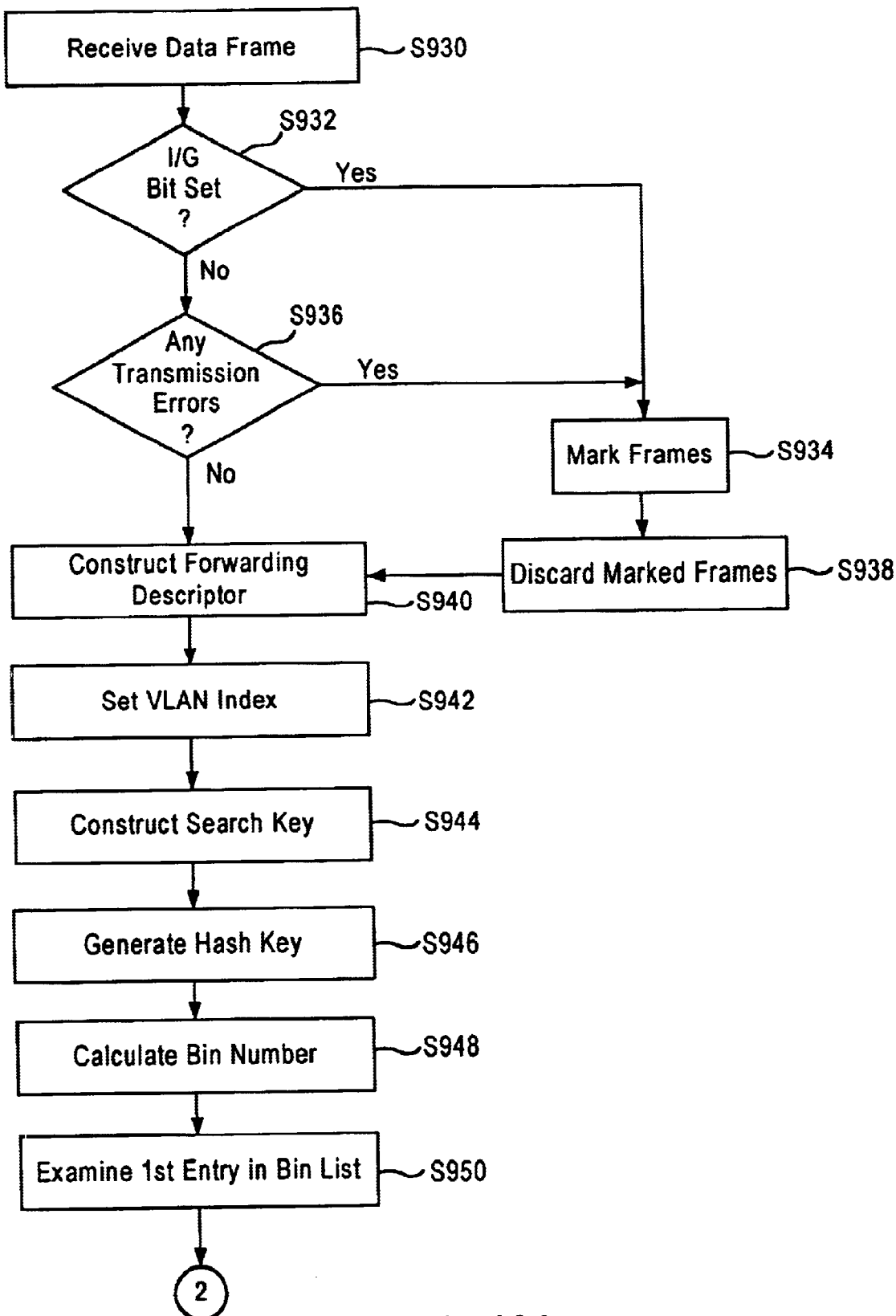
FIGS. 10A–10C are a flow chart illustrating the methodology used to forward received data frames without the use of a CPU.
Figure 10B:
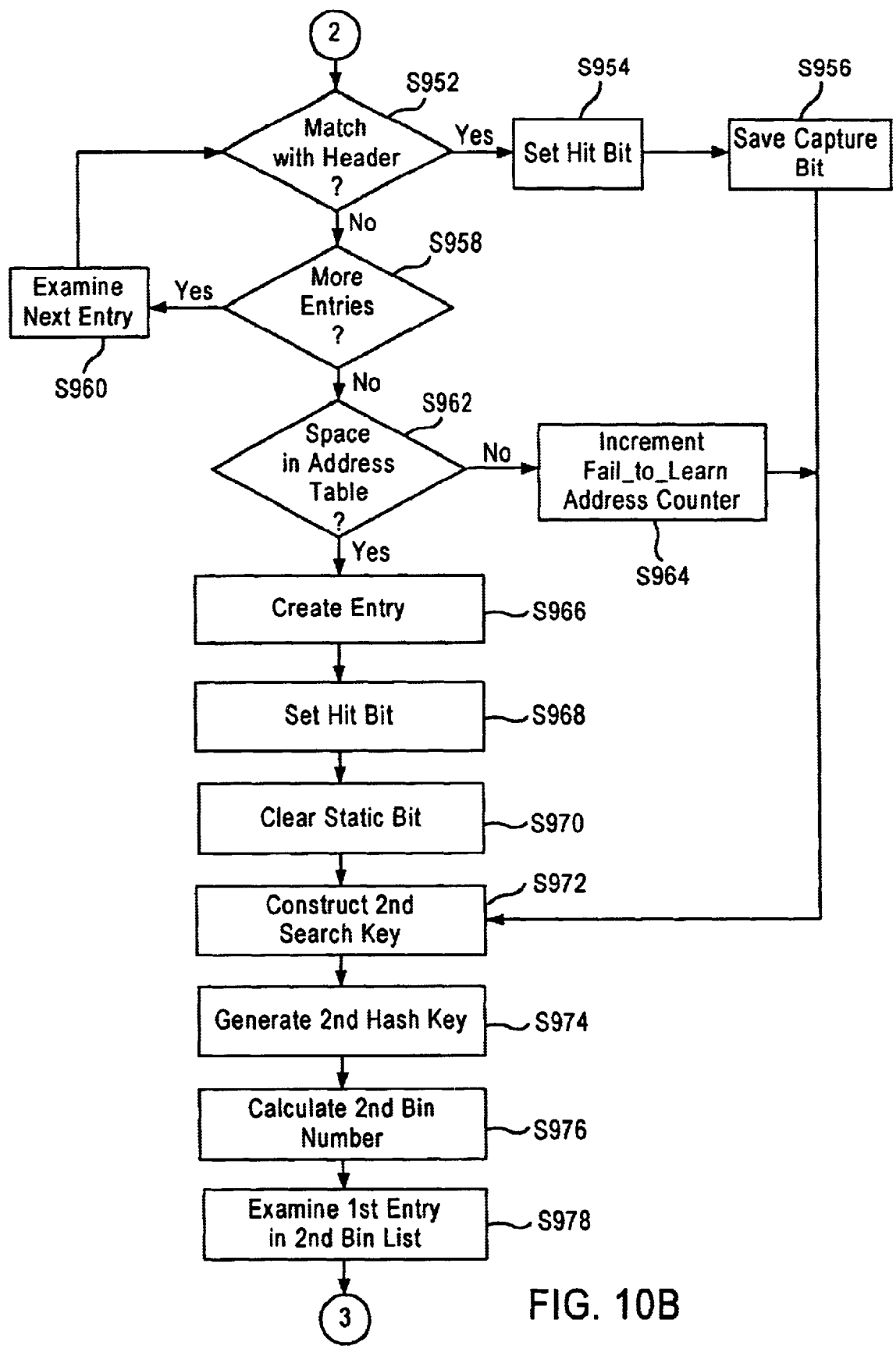
Figure 10C:
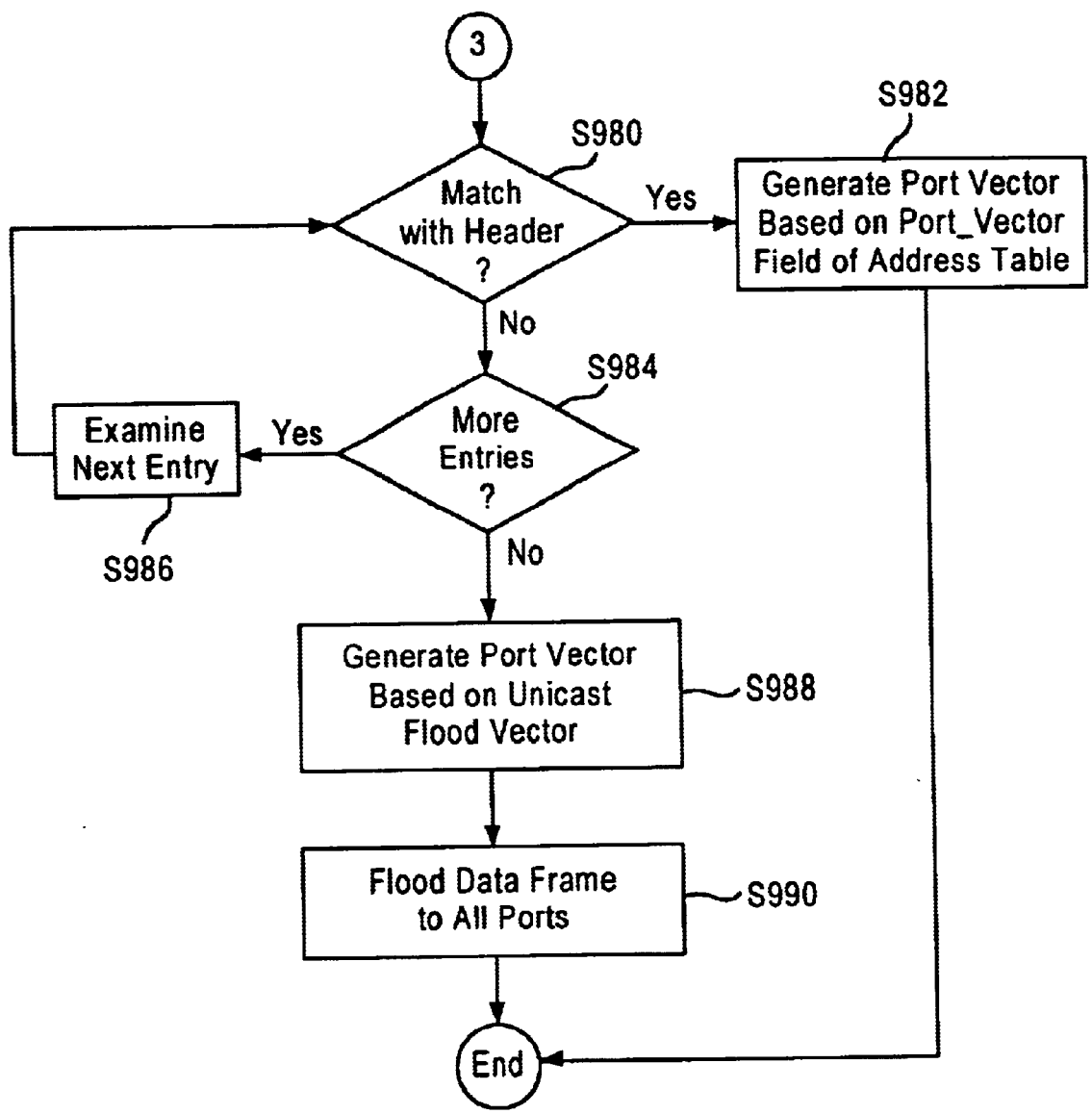

FIG. 10 is a flow chart illustrating the steps performed when received data frames must be forwarded to the appropriate output port 14 without the use of a CPU 32, according to the disclosed embodiment of the present invention. At step S930, an individual data frame is received by the multiport switch 32. At step S932, the header of the received data frame is examined in order to determine if the individual group bit is set. If the individual group bit is set, then the IRC 40 treats the data frame as if it were received with errors. Accordingly, control passes to step S934 where the received data frame is appropriately marked as erroneous. If the individual group bit is not set, then control passes to step S936. As described herein, the check performed on the header of the received data frame at step S932 can also be considered as a check for a multicast source address. Hence, a multicast frame can be defined as a frame whose individual group bit is set.

At step S936, the IRC 40 determines if any transmission errors have occurred while transmitting the data. This can be accomplished in many ways including, for example, by performing a CRC check on the received data frame. If the IRC 40 determines that transmission errors have occurred, then control passes to step S934 where the frame is marked as containing errors. If no errors have occurred, then control passes to step S940. The operations performed at steps S932–S936 correspond to the application of an ingress rule to the header of the received data frame. As previously described with respect to steps S932–S936, application of the ingress rule results in the detection of certain types of errors within the received data frame.

At step S938, the IRC 40 discards all frames that have been marked as containing errors. This can be accomplished in several ways. For example, according to one embodiment of the present invention, if the IRC 40 determines that the received data frame contains errors, then a forwarding descriptor is constructed with a null port vector field. The null port vector subsequently causes the received data frame to be discarded. Furthermore if the IRC 40 constructs a forwarding descriptor containing a null port vector, the forwarding descriptor may be passed directly to the port vector FIFO 56 without performing any additional operations. If the received data frame does not include a multicast source address, then a forwarding descriptor is constructed at step S940.

The forwarding descriptors constructed by the IRC 40 are used to specify which of the output ports will forward data frames received by the multiport switch 12. According to the disclosed embodiment of the present invention, the forwarding descriptor is constructed by applying an egress rule to the header of the received data frame. Application of the egress rule requires that the IRC 40 mask the receive port bit from a port vector field that is contained in the forwarding descriptor. Furthermore, the IRC 40 will mask any additional bits from the port vector field that correspond to ports that have been disabled by the multiport switch 12. At step S942, the IRC 40 sets (i.e., assigns a value of 1 to) the VLAN index of the received data frame.

According to the disclosed embodiment of the present invention, if the VLAN index of the received data frame is 1, the IRC 40 will perform a first search of the address table 84 (described in further detail herein below) in order to obtain an entry (in the bin list) whose address, VLAN index, and receive port fields match the source address, VLAN index, and receive port of the received data frame. At step S944, a search key is constructed for the received data frame. The search key is constructed, as previously described, based on the source address and the VLAN index assigned to the data frame. According to one embodiment of the present invention, the search key is constructed by concatenating the 16 least significant bits of the source address together with the VLAN index of the header, although different methodologies may be implemented.

At step S946, a hash key is generated for the received data frame. This is accomplished by applying the hash function calculator 100 to the search key in order to generate the hash key. At step S948, a bin number is calculated based on the hash key generated. The bin number identifies which bin list from the address table 84 corresponds to the received data frame. The IRC 40 examines the first entry in the identified bin list at step S950.

At step S952, the IRC 40 determines if there is a match between the current entry of the bin list being examined and the header of the received data frame. This determination is made by examining the sending address, the VLAN index, and the receive port of the received data frame with corresponding fields of the entry being currently examined. If there is a match between the data frame and the current entry of the bin list then control passes to step S954, else control passes to step S958.

At step S954, the IRC 40 sets the hit bit for the current entry. According to one embodiment of the present invention, if the address and VLAN index are matched but the receive port field in the entry of the bin list points to a port that is in the same trunk as the data frame's received port, then the IRC 40 will also set the hit bit for that entry. If the address and VLAN index match, but the receive port of the entry does not agree with the data frame's receive port, then the static bit of the entry is examined. If the static bit is set, then the IRC 40 sets the hit bit for the entry and sets the management queue bit in the forwarding descriptor.

If the static bit is not set, then the IRC 40 updates the entry with all new data. At step S956, the capture bit of the entry is saved by the IRC 40. Control then passes to step S972.

If a match was not detected at step S952, then control passes to step S958, where the IRC 40 determines if there are any additional entries in the bin list. If there are additional entries, then at step S960 the next entry in the bin list is examined. Control then returns to step S952 in order to determine if there is a match between the current entry being examined and the received data frame. If there are no additional entries, then sending address (SA) is not in the address table 84, and the IRC 40 must add a new entry to the address table 84.

Accordingly, control passes to step S962, where the IRC 40 determines if there is space available in the address table 84 to construct a new entry. If there is no space available, then the value of a learned address counter is incremented at step S964. The learned address counter is a counter that specifies the number of addresses that have not been learned by the IRC 40 during the forwarding process. From step S964, control passes to step S972. If there is space available in the address table 84, then at step S966 a new entry is constructed therein. The IRC 40 then sets the hit bit for the new entry at step S968. At step S970 the IRC 40 clears the static bit of the new entry by storing a value of zero (0) therein.

The second search begins at step S972, where the IRC 40 constructs a second search key. The second search key is constructed based on the destination address and the VLAN index of the received data frame. At step S974, a second hash key is generated by applying a second hash function calculator to the second search key. According to one embodiment of the present invention, the same hash function calculator 100 used to construct the first hash key is used to construct the second hash key.

At step S976, a second bin number is calculated based on the second hash key. At step S978, the IRC 40 examines the first entry from the second bin list. The IRC 40 determines if there is a match between the current entry of the bin list and the received data frame by comparing the address and VLAN index of the entry to the destination address and VLAN index of the data frame. If there is a match, then at step S982, the IRC 40 generates a port vector, based on the port vector field of the entry within address table 84. The port vector generated is then forwarded to the port vector FIFO 56. If there is not a match, then at step S984 the IRC 40 determines if there are additional entries in the bin list. If there are additional entries, then at step S986 the next entry in the bin list is examined.

Once the next entry has been examined, control returns to step S980 so that all entries will be examined. If there are no additional entries in the bin list then control passes to step S988. At this point, the IRC 40 generates a port vector for the received data frame based on a unicast flood vector. The port vector is then forwarded to all ports of the multiport switch 12, except those ports that have been either disabled or masked. The sequence performed in step S930 to step S990 is then repeated for each and every subsequent data frame received by the multiport switch 12.

Hence, the present arrangement allows the multiport switch to be quickly initialized without any reliance on an external CPU. One advantage of such an arrangement is the minimization of downtime experienced before the multiport switch is operational. In addition, the overall operating cost of the multiport switch is reduced because there is no reliance on the CPU when performing routine forwarding operations.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of operating a network switch in a CPU-less environment comprising the steps:

transmitting an initialization signal from a control interface of the network switch to initialize an internal rules checker that decides which one or more output ports of the network switch will output a received data frame, the initialization signal indicating non-connection of a CPU to the control interface;

transmitting a ready signal to the control interface to indicate that the internal rules checker is initialized;

enabling the network switch for forwarding received data frames; and forwarding received data frames to the one or more output ports of the network switch based on a source address and a destination address stored in a header of each received data frame.

2. A method of operating a network switch in a CPU-less environment comprising the steps:

transmitting an initialization signal from a control interface of the network switch to an internal rules checker that decides which one or more output ports of the network switch will output a received data frame;

transmitting a ready signal to the control interface to indicate that the internal rules checker is initialized;

enabling the network switch for forwarding received data frames;

forwarding received data frames to the one or more output ports of the network switch based on a source address and a destination address stored in a header of each received data frame; and disabling a management queue, of the network switch, that queues entries for access by the CPU-less environment.

3. The method of claim 1, further comprising a step of setting a predetermined time interval for aging entries stored in an address table of the internal rules checker.

4. The method of claim 3, wherein the step of setting a predetermined time interval includes the step of setting a 300 second delay for aging entries stored in the address table of the internal rules checker.

5. The method of claim 1, wherein the step of enabling the switch includes the step of initializing operating components of the network switch.

6. A method of operating a network switch in a CPU-less environment comprising the steps:

transmitting an initialization signal from a control interface of the network switch to an internal rules checker that decides which one or more output ports of the network switch will output a received data frame;

transmitting a ready signal to the control interface to indicate that the internal rules checker is initialized;

enabling the network switch for forwarding received data frames; and forwarding received data frames to the one or more output ports of the network switch based on a source address and a destination address stored in a header of each received data frame;

wherein the step of enabling the switch includes the step of initializing operating components of the network switch; and wherein the step of initializing further includes the steps:
  loading stored default values into respective registers of the network switch;
  initialing queues of the network switch to default values; and
  clearing an external memory storage area used by the network switch.

7. The method of claim 1, further comprising a step of executing an ingress routine, by the internal rules checker, to detect errors in each received data frame.

8. The method of claim 7, wherein the step of executing an ingress routine further includes the steps:
  examining an individual group bit contained in the source address of the header of each received data frame;
  marking the received data frame as containing errors if the individual group bit is set;
  determining if the received data frame contains any transmission errors; and
  discarding all received data frames that contain errors.

9. The method of claim 1, further comprising a step of executing an egress routine, by the internal rules checker, to construct forwarding descriptors that specify which of the one or more output ports will output each received data frame.

10. The method of claim 9, wherein the step of constructing a forwarding descriptor further comprises the steps:
  masking a receive port bit from a port vector field contained in the forwarding descriptor; and
  masking additional bits, from the port vector field, corresponding to disabled output ports of the network switch.

11. The method of claim 1, wherein the step of forwarding received data frames further includes the steps:
  performing a first search of the address table to obtain an entry whose address, VLAN index, and receive port fields match the source address, VLAN index, and receive port from each received data frame; and
  performing a second search of the address table to obtain a second entry whose address and VLAN index match the destination address and VLAN index from each received data frame.

12. The method of claim 11, wherein the step of performing a first search of the address table further includes the steps:
  assigning a value of 1 to a VLAN index of each received data frame; and
  passing the header of each received data frame through a sending address lookup logic to obtain the matching entry in the address table.

13. The method of claim 12, wherein the step of passing further includes the steps:
  constructing a search key based on the source address and VLAN index of the received data frame;
  locating, based on the search key, a bin number that identifies which bin list from the address table corresponds to the received data frame; and
  searching the bin list to find an entry whose address, VLAN index, and receive port match the source address, VLAN index, and receive port of the received data frame.

14. The method of claim 13, wherein the step of constructing a search key further includes the step of concatenating the 16 least significant bits of the source address and the VLAN index of the received data frame to form the search key.

15. The method of claim 13, wherein the step of locating a bin number further includes the steps:
  applying a hash function calculator to the search key to generate a hash key; and
  calculating the bin number, based on the hash key.

16. The method of claim 13, wherein the step of searching further includes the steps:
  examining each entry in the bin list;
  if an entry contains the sending address, VLAN index, and receive port of the received data frame, then performing the steps:
    setting a hit bit for the entry, and
    saving the value of a capture bit for the entry; and
  if the entry does not contain the matching address, VLAN index, and receive port of the received data frame, then performing the steps:
    creating a new entry in the address table,
    setting the hit bit of the new entry, and
    clearing a static bit of the new entry.

17. The method of claim 16, wherein the step of creating a new entry further includes the steps:
  determining if there is space available in the address table for storing a newly created entry;
  if there is space available, then adding the newly created entry to the address table;
  if there is no space available in the address table, then incrementing the value of a counter in the internal rules checker, the counter being used to provide an indication of the number of addresses not learned by the internal rules checker.

18. The method of claim 11, wherein the step of performing a second search of the address table further includes the steps:
  constructing a second search key based on the destination address and VLAN index of the received data frame;
  locating, based on the search key, a second bin number that identifies a second bin list from the address table corresponding to the received data frame; and
  searching the second bin list to find an entry whose address and VLAN index match the destination address and VLAN index of the received data frame.

19. The method of claim 18, wherein the step of locating a second bin number further includes the steps:
  applying a second hash function calculator to the second search key to generate a second hash key; and
  calculating the second bin number based on the second hash key.

20. The method of claim 18, further comprising the step of generating a port vector for each received data frame.

21. The method of claim 20, wherein the step of generating a port vector further includes the steps:
  examining each entry in the second bin list;
  if an examined entry contains the destination address and VLAN index of the received data frame, then generating the port vector for the received data frame based on a port vector field contained in a corresponding entry of the address table; and
  if an examined entry does not contain the matching destination address and VLAN index of the received data frame, then performing the steps:
    generating the port vector based on a unicast flood vector generated by the internal rules checker, and flooding the received data frame to all ports of the network switch.

22. Apparatus for operating a network switch in a CPU-less environment comprising:

a control interface for generating an initialization signal, said control interface being configured for connecting a CPU to said network switch, said initialization signal indicating absence of the CPU; and an internal rules checker for receiving said initialization signal and initializing said network switch;

said internal rules checker being configured for forwarding data frames received by said network switch to one or more output ports based on a sending address and a destination address stored in a header of said received data frames.

23. Apparatus for operating a network switch in a CPU-less environment comprising:

a control interface for generating an initialization signal, said control interface being configured for connecting a CPU to said network switch, said initialization signal indicating absence of the CPU; and an internal rules checker for receiving said initialization signal and initializing said network switch;

said internal rules checker being configured for forwarding data frames received by said network switch to one or more output ports based on a sending address and a destination address stored in a header of said received data frames wherein said internal rules checker is further configured for disabling a management queue of said network switch, said management queue being available for queuing entries for the CPU.

24. The apparatus of claim 22, wherein said internal rules checker further includes:

an address table for storing a plurality of entries that contain addresses of output ports associated with said network switch;

an ingress rules logic circuit for detecting errors contained in said received data frames;

a controller for searching said address table to obtain entries that match said received data frames; and an egress rules logic circuit for constructing a forwarding descriptor for each received data frame, said forwarding descriptor including information that specifies which output ports will output said received data frames.

25. The apparatus of claim 24, wherein said controller is configured to:

perform a first search of said address table to obtain an entry whose address, VLAN index, and receive port fields match the source address, VLAN index, and receive port of said received data frame; and perform a second search of said address table to obtain a second entry whose address and VLAN index match the destination address and VLAN index from said received data frame.

26. The apparatus of claim 24, wherein said controller further includes a first and second hash function calculator, said controller being further configured to:

construct a search key based on a source address and VLAN index of said received data frame; and pass said search key through said first hash function calculator to generate a hash key for matching said received data frame to an output port of said network switch based on a sending address, VLAN index, and receive port of said received data frame; and pass said search key through said second hash function calculator to generate a hash key for matching said received data frame to an output port of said network switch based on a destination address and VLAN index of said received data frame.

27. The apparatus of claim 24, wherein said internal rules checker further includes circuitry for transmitting unmatched data frames to all active ports of said network switch.

* * * * *